(Model.)
J. BROWN, Jr.
SIGN.
No. 276,558. Patented May 1, 1883.
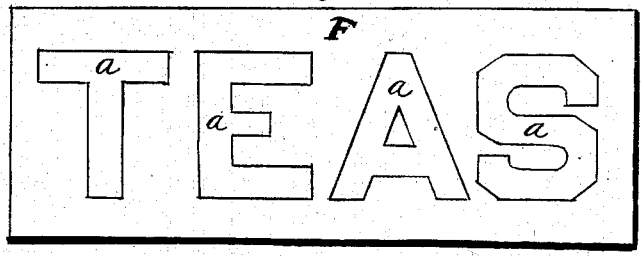
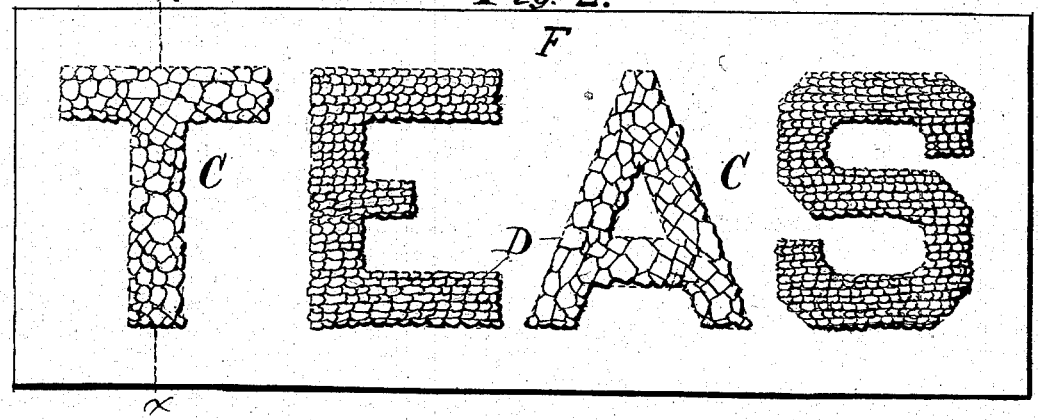
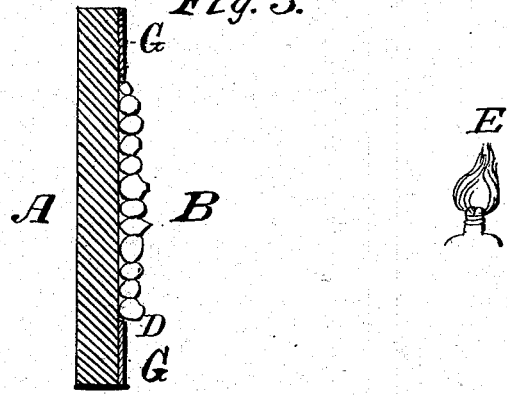
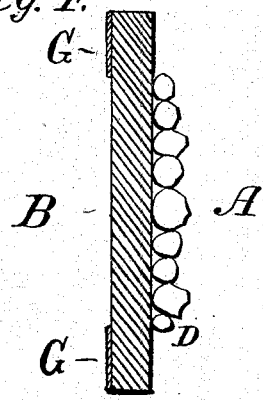
Witnesses.
Laura Brown
John Anderson Fivey
Joshua Brown Jr
Inventor

UNITED STATES PATENT OFFICE.

JOSHUA BROWN, JR., OF NEW YORK, N. Y.

SIGN.

SPECIFICATION forming part of Letters Patent No. 276,558, dated May 1, 1883.

Application filed July 18, 1882. (Model.)

*To all whom it may concern:*

Be it known that I, JOSHUA BROWN, Jr., of the city, county, and State of New York, have invented a new and useful Improvement in Signs, (which are so constructed that, while they may be more or less serviceable as signs in ordinary daylight, they are peculiarly adapted for use for what are known as "transparencies," operated by artificial light projected upon them from behind at night,) of which the following is a specification.

In constructing my sign I take a sheet or piece of plain glass, as common window-glass, F, on which any lettering, characters, or devices are cut in by a painted background, G, and place it in such a position that the characters intended to be seen at night are left transparent, or wrought in partially-transparent tints, the rest of the surface being usually rendered opaque. To the blank transparent portion of the glass forming the letters or characters a, I attach globular or cylindrical pieces D, of transparent or semi-transparent material—such as glass beads, balls, gems, paste, and gum or gelatine—and, either by stringing or fastening them together or by the use of adhesive substance alone, affixing or placing them continuously and close together, like paving, so that the cylindrical or globular portion of the material will come immediately on the front or back of the parts of the glass which are left transparent, as at a, so as to be seen at night-time by the aid of a jet or stream of artificial light, E, projected against the sign from behind. The effects of this arrangement are as follows: First, the transparent or semi-transparent globular or cylindrical material— as beads—so attached behind or in front of the glass letters or characters admits the rays of light and doubles them up around their surfaces, reflecting only a feeble gleam, while a much greater thickness of plain broken glass is necessary to produce a refraction of rays and obstruct the vision; second, perfectly transparent materials placed on any plane close together, as above, in globules are largely impervious to the eye, so far as seeing through them is concerned, the result being that the vision is almost perfectly arrested at the surface of the letter or character. These two elements so combined serve precisely the purpose desired. A brilliant light is produced on the surface, and the sight and attention are there arrested and naturally directed to whatever lettering or design has been placed on the glass.

In the drawings, Figure 1 is a front view of a glass sign prepared for the application of my improvement. The whole background G, except the part a, forming the letters, is rendered opaque, or may be of other color. The lettering a is transparent, or partially transparent, and is what painters term "cut in."

Fig. 2 shows the same letters, with beads of glass or other transparent or semi transparent material of globular or cylindrical form affixed close together over the whole surface of the letters, either on the back or front of the glass.

Fig. 3 is a vertical section of the sign, on line x x of Fig. 2, through the center of the letter T. In this case the pieces of transparent material are placed on the back of the glass. A is the front of the sign. B is the back. C is the letter shown formed of the globular or cylindrical transparent or semi-transparent material, consisting of beads or other globular forms attached to the front and back of the glass on the transparent letters a. E is the lamp or gas jet which is to illumine the sign.

Fig. 4 represents a similar vertical section in cases where the beads or globules are placed on the front surface of the sign.

My plan of attaching transparent or semi-transparent material to glass for signs for the purposes of illumination is different from the means now generally in use of constructing glass transparencies, without any supporting medium of plain glass, by inlaying glass globes, cubes, or prisms separately in some solid framework—as iron, zinc, or tin—which is an entirely different and necessarily a much more expensive process.

I am aware that signs have been made by cutting in letters on glass by means of an opaque colored backing and by placing behind the glass a packing of broken flat pieces of transparent material, which are confined between two panes of glass, so that when light is made to shine through the letters their plain character is broken up by the different-colored broken crystals. I am also aware that signs have been formed by uniting by adhesive substance different-colored powdered glass to the front and back of the letters on a pane of glass cut in by a painted background; but

What I claim, and desire to secure by Letters Patent, is—

A sign consisting of letters or characters $a$, cut in glass by a painted background, G, the letters having globular or cylindrical pieces of transparent material D attached to them, so that the cylindrical part of the material will come immediately against the letters on the glass, the globular or cylindrical material being attached on the front or back of the glass over the letters, and adapted for the passage of the rays of light through them, substantially as described and shown, and for the purpose set forth.

JOSHUA BROWN, JR.

Witnesses:
AUGUST MARDORF,
JOHN ANDERSON FIVEY.